Jan. 30, 1923.
H. C. MIEVILLE.
BROILER.
FILED AUG. 20, 1921.
1,443,546
2 SHEETS-SHEET 1
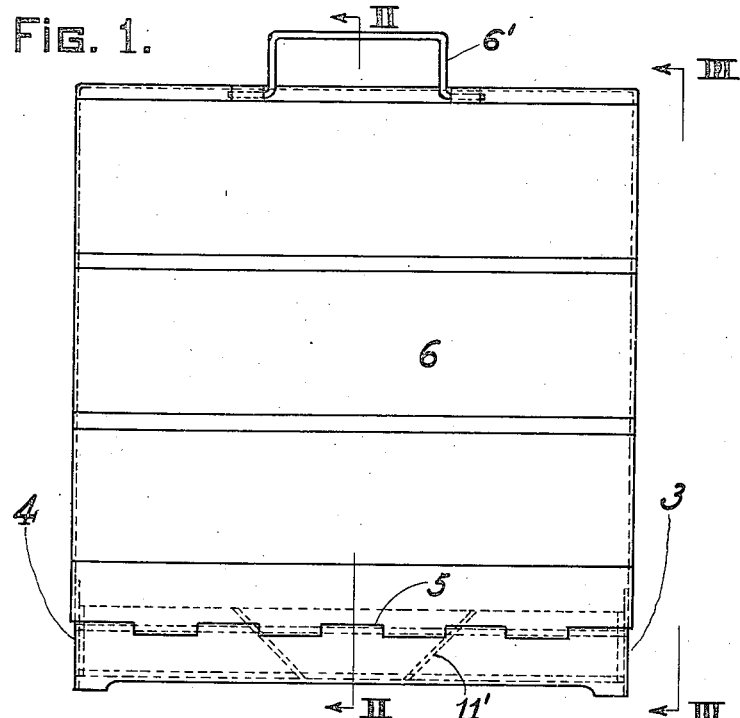
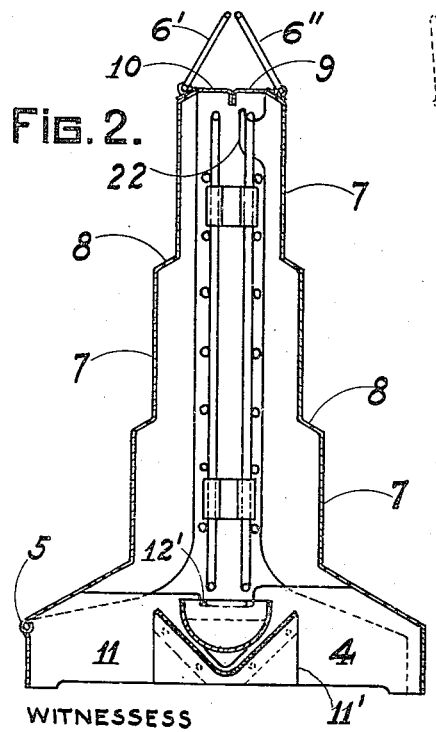
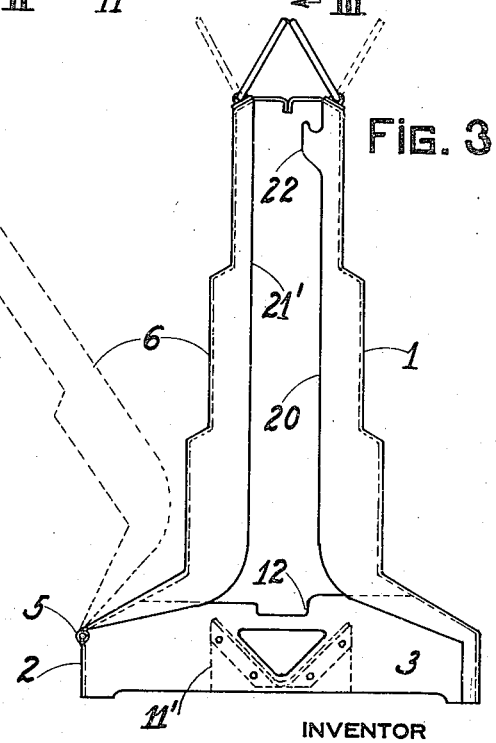
WITNESSES
A. B. Wallace
INVENTOR
Herbert C. Mieville
BY
Winter & Brown
ATTORNEYS Jan. 30, 1923. 1,443,546
H. C. MIEVILLE.
BROILER.
FILED AUG. 20, 1921. 2 SHEETS-SHEET 2
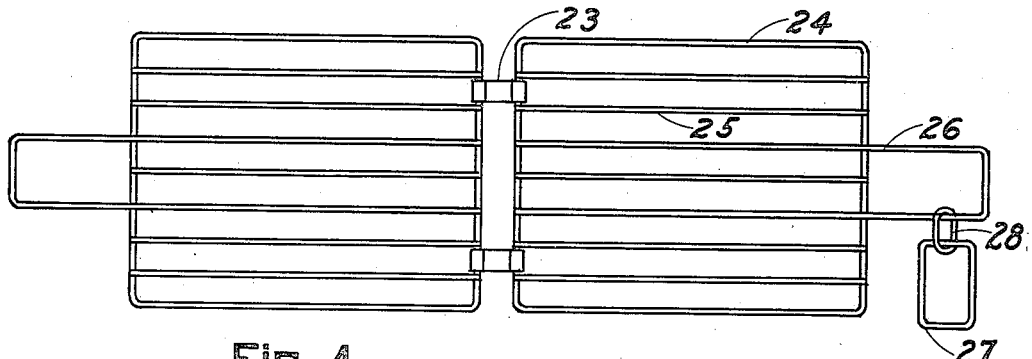
Fig. 4.
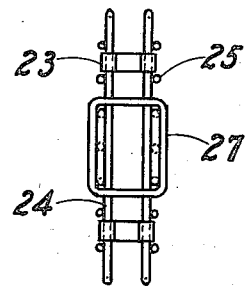
Fig. 5.
Fig. 6.
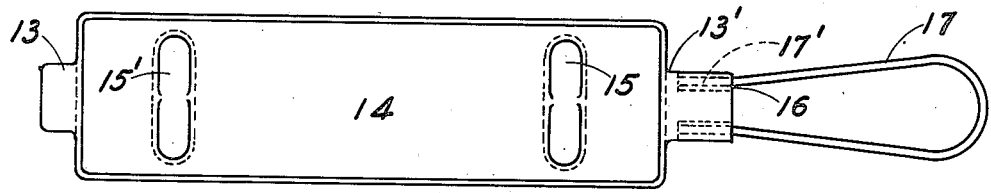
Fig. 8.
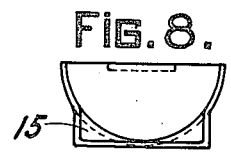
Fig. 7.
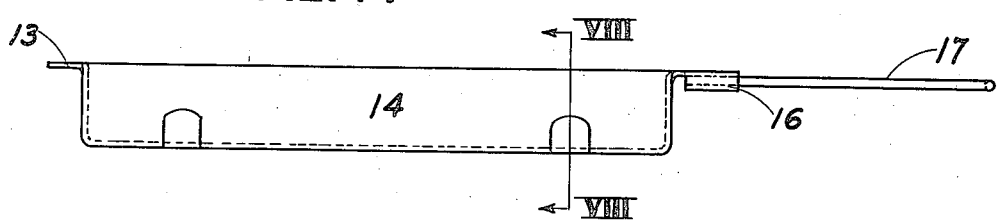
WITNESSESS
A.B.Wallace.
INVENTOR
Herbert C. Mieville
BY Winter & Brown
ATTORNEYS Patented Jan. 30, 1923.

1,443,546

UNITED STATES PATENT OFFICE.

HERBERT C. MIEVILLE, OF NEW YORK, N. Y., ASSIGNOR TO SQUIRE PRODUCTS COMPANY, OF PITTSBURGH, PENNSYLVANIA, A CORPORATION OF DELAWARE.

BROILER.

Application filed August 20, 1921. Serial No. 493,971.

*To all whom it may concern:*

Be it known that I, HERBERT C. MIEVILLE, a subject of the King of Great Britain, and a resident of New York, in the county of New York and State of New York, have invented a new and useful Improvement in Broilers, of which the following is a specification.

This invention relates to broilers or cookers, and particularly to that type employed for broiling meats, such as steak, chops and fish. It especially relates to an apparatus that may be set over an open gas burner and in which the food being cooked is held edgewise and thus exposed on both sides to the heat.

The objects of the invention are to provide a simple device of the character referred to which may be readily assembled and easily cleaned, which operates with a minimum production of smoke or odors, which evenly distributes the heat without direct exposure to the flame itself, thus eliminating scorching and burning, in which little heat is lost or dissipated, which will eliminate the necessity of turning the meat during cooking, in which means for catching the gravy is provided, and in which the several parts will not only be held firmly in assembled relation but will be stable when removed.

These, and other objects of the invention, will readily appear from the following description and the appended claims.

Like reference characters are used to designate corresponding parts throughout the several figures of the drawings in which Fig. 1 is a side elevation of a broiler embodying my invention; Fig. 2 a vertical sectional view taken on the line II—II of Fig. 1; Fig. 3 an end elevation of the device illustrated in Fig. 1; Fig. 4 a detail elevational view showing the grid in open position; Fig. 5 an elevational view of the grid in closed position; Fig. 6 a plan view of the drip or gravy pan; Fig. 7 a side elevation of the same; and Fig. 8 a transverse sectional view taken on the line VIII—VIII of Fig. 7.

Meats, such as steaks, chops, fish and the like, are broiled by exposing them to the heat of a fire or flame. This is ordinarily done, either by suspending the meat over a fire or other source of heat, in which case the juices that are given off by the meat during cooking fall into the fire and are lost, or else by suspending the meat under a gas flame with a pan under the meat to catch the drippings therefrom. Each method is wasteful, either of the food itself or of the heat applied; and, in either case, the heat is applied only to one side of the meat at a time, therefore requiring extra time for cooking as well as the trouble of turning with a consequent loss of fuel. Such methods also result in a production of smoke and objectionable odors due to the meat juices falling directly into the fire. These and other objections are well known to those familiar with this art.

The present invention avoids all of these objections and provides in a compact form a broiler which will hold steaks, chops, fish, toast or the like in such position as to derive the full benefit from the fuel used and which will uniformly cook meat simultaneously on both sides, while at the same time saving all of the drippings. In addition, it is durable, may be economically manufactured from sheet metal, is easily cleaned and entirely sanitary.

The broiler embodying this invention comprises a main casing of sheet metal having side walls 1 and 2 and end walls 3 and 4. Attached to the casing at one side by a hinge 5 running the full length of the side walls is a door 6 having the attached handle 6' for cooperating with the handles 6" mounted on the top of said wall 1. These handles are mounted with a swivel connection so that normally they stand out as shown in dotted lines in Fig. 3 to prevent their becoming too hot, but can be moved to the position indicated in full lines to form a single handle for lifting and carrying the broiler.

It will be observed that the casing has an open bottom adapted to be placed over the source of heat and the sides thereof are formed of a series of upwardly extending surfaces 7 which are substantially vertical so as to correspond to the plane of the grid when positioned within the broiler, and the surfaces 7 are connected to each other by upwardly and inwardly inclined deflecting surfaces 8 for directing the heat toward the grid. Both the side wall 1 and door 6 are provided adjacent the top with overlapping flanges 9 and 10 which abut to form a closed top when the door 6 is in closed position.

Extending from end to end of the casing adjacent its bottom and in its central plane is a V-shaped deflecting baffle 11 having the transverse auxiliary deflecting baffles 11' attached near its central portion for deflecting the heat towards the sides and ends of the casing. The deflector 11 is supported by riveting to the end walls 3 and 4, said end walls being provided in their upper edges with notches 12 and 12' for receiving extensions 13, 13' formed at the opposite ends of the drip pan 14 so as to support the same immediately above the deflecting baffle 11.

The drip pan 14 is provided in its bottom adjacent its opposite ends with struck up portions 15, 15' which form flat supporting surfaces for the pan when removed from the broiler. The extension 13' has integral ears 16 which are bent as shown in Figures 6 and 7 to form sockets for the reception of the ends of a spring handle. The handle is readily attached to the pan by simply springing its ends 17' together so as to be inserted in the sockets of the pan, when pressure upon the handle is released to allow the resiliency of the handle to force its ends into frictional engagement therewith. By gripping the handle sufficiently to relieve such frictional engagement, the same may be easily withdrawn.

Each end of the side wall 1 and the door 6 is provided with inturned flanges 20 and 21 which terminate short of the central plane of the broiler thus forming narrow vertical openings extending from the top to the end walls 3 and 4. The flanges 20 have hooks 22 formed integral therewith near the top of the device for supporting the grid used for holding the food being cooked as clearly shown in Fig. 2.

The grid consists of two grid members connected by the links 23 and each grid member is formed of wire loops 24 and of transverse bars 25 which may be attached thereto by welding or in any other desired manner. Two of the cross bars are extended beyond the loops 24 to form the handles 26, and the handle of one grid member is provided with a locking loop 27, the locking loop being supported on the handle by means of the ring 28.

In use, the broiler is set over a stove burner or other source of heat. The meat or other article to be cooked is spread out between the grid members 24 and is securely held therein by slipping the locking loop over the handles 26 in the manner shown in Fig. 5. The door 6 is then opened, the drip pan placed in position, and the grid hung upon the hooks 22, thus being supported in vertical position as shown in Fig. 2, and the door closed.

The heat from the burner passes upwardly into the shell or casing, being deflected by the baffle 11 towards the sides, and as it rises to the top is confined between the surfaces 7, and is deflected inwardly towards the grid and again confined somewhat nearer the grid by the next succeeding surface 7, the heated air finally escaping through the openings at the ends of the broiler. It will be observed that the succeeding surfaces 7 are located nearer the grid as they approach the top, thus causing a substantially uniform distribution of heat from the burner to the grid throughout its entire extent, regardless of the fact that the heat is more intense near the bottom and gradually decreases in intensity as it rises to the top. This secures uniform cooking of the meat simultaneously and equally on both sides.

The drippings from the meat during cooking are caught by the drip pan 14 which is supported directly under the meat and which extends the full length of the broiler. This may be removed readily and emptied by means of the detachable handle 17. The pan 14 is rendered quite stable by the flattened portions 15, 15' and hence may be set upon a table or other support without fear of overturning.

Before commencing to cook, a small quantity of water is generally placed in the pan 14 which during the cooking process is partially evaporated, thus aiding in the production of a gravy of the desired consistency.

I claim:

1. A broiler comprising a sheet metal casing adapted to seat over a burner, the side walls of said casing being provided with a series of upwardly extending sections connected by inclined deflecting sections for directing the heat from the burner toward the center of the casing.

2. A broiler comprising a sheet metal casing having side and end walls, a grid adapted to hang in vertical position within the broiler, said side walls being formed of a plurality of superposed vertical sections connected by upwardly and inwardly inclined deflecting sections for directing heat towards said grid.

3. A broiler comprising a sheet metal shell, a fixed wall on one side, a door on the opposite side, a grid adapted to be hung from said wall in vertical position within the broiler, said fixed wall and door being formed of a plurality of superposed vertical sections offset from each other and having inclined deflecting sections between the vertical sections for directing heat toward said grid.

4. A cooking utensil comprising a casing open at its bottom and having side walls, a longitudinal V-shaped baffle extending from end to end of the casing near its bottom and adjacent its central plane, said side walls being formed of alternate upwardly extending and inclined deflecting surfaces, each succeeding surface being positioned nearer the said central plane.

5. A cooking utensil comprising a shell, the side wall of the shell and said door being formed of a series of superposed vertical sections connected by inwardly and upwardly inclined deflecting surfaces, a door at one side, a main baffle member adjacent its bottom and extending from end to end thereof, transverse auxiliary baffles attached to said main baffle member, a grid adapted to hang in vertical position within said shell, the ends of the shell having narrow vertical openings and a drip pan within the shell between the grid and main baffle member.

6. A cooking utensil comprising a shell, a door at one side, a baffle member adjacent its bottom and extending from end to end thereof, a grid adapted to hang in vertical position within said shell, the ends of the shell having narrow vertical openings, a drip pan within the shell between the grid and baffle member, the opposite ends of said drip pan being provided with extensions projecting through and seated in the openings in the end walls.

In testimony whereof, I sign my name.

HERBERT C. MIEVILLE.

Witness:
W. C. MEYER.